Sept. 4, 1962 W. F. VELING 3,052,233
CARDIAC MONITOR
Filed Sept. 24, 1958 3 Sheets-Sheet 1
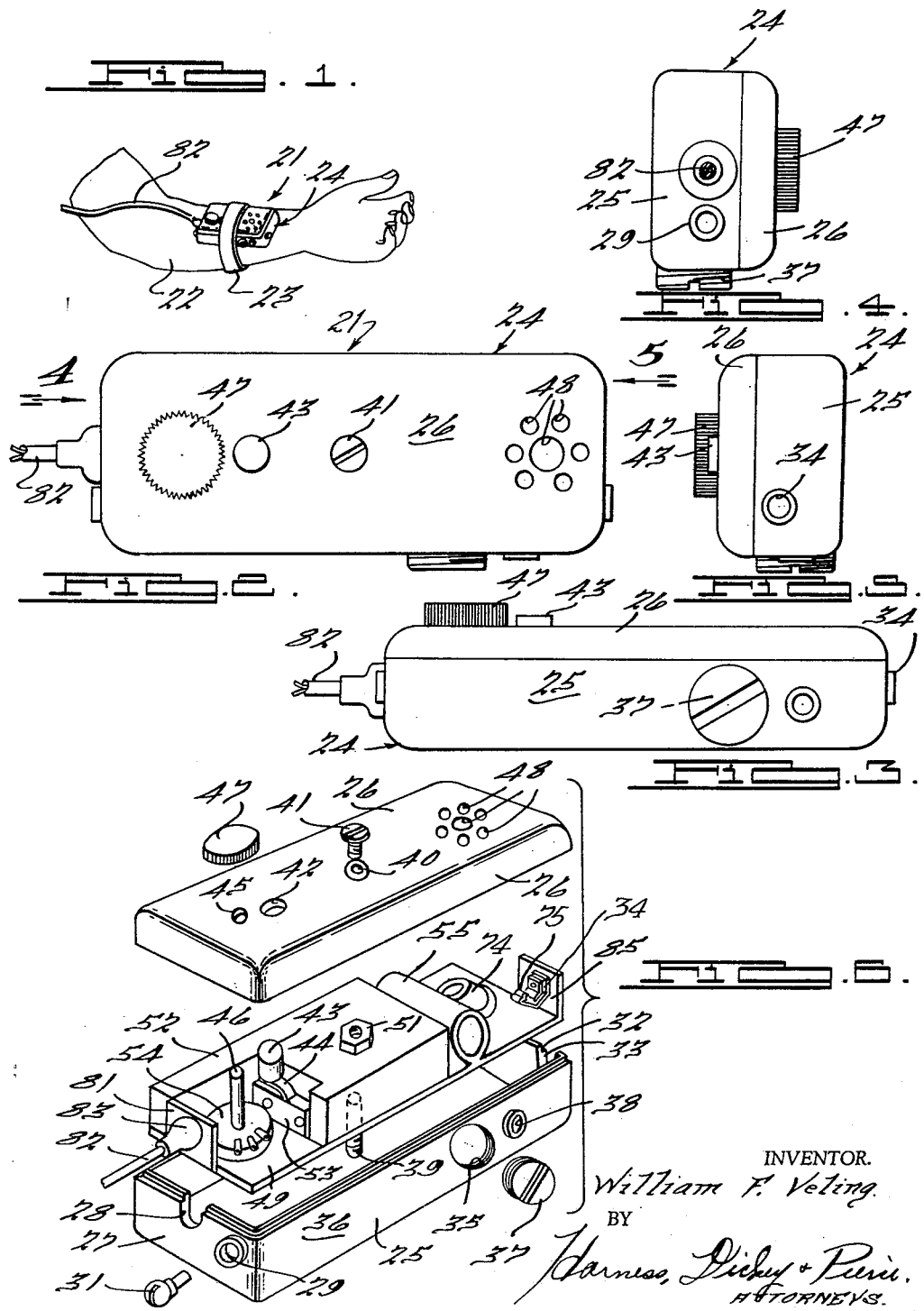
INVENTOR.
William F. Veling
BY
Harness, Dickey & Pierce
ATTORNEYS.

Sept. 4, 1962 W. F. VELING 3,052,233
CARDIAC MONITOR
Filed Sept. 24, 1958 3 Sheets-Sheet 2
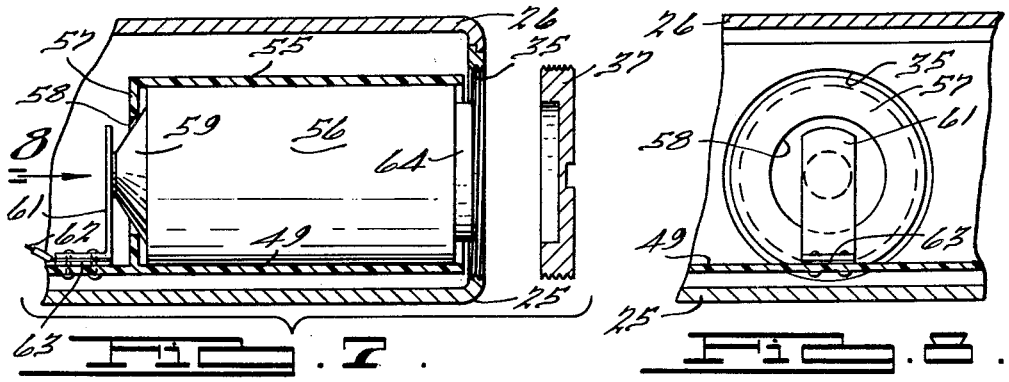
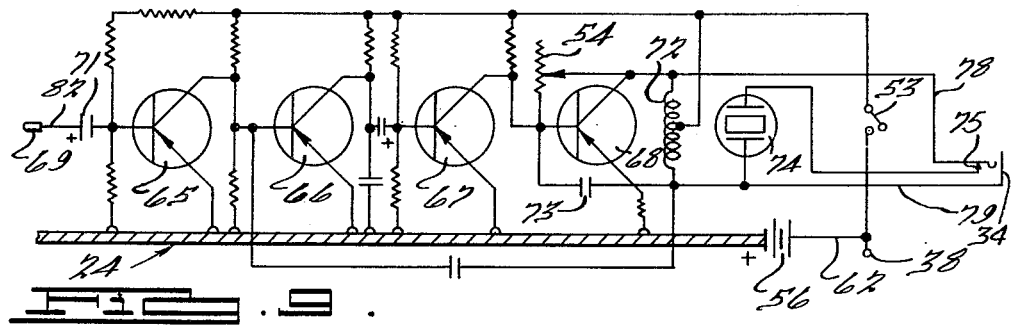
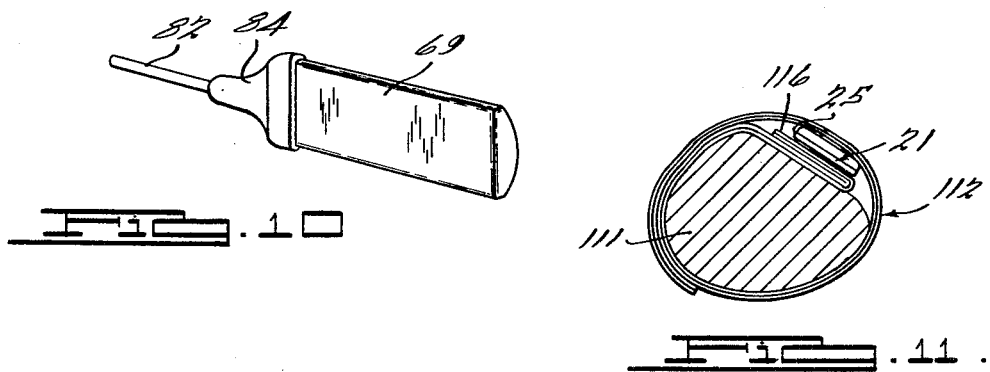
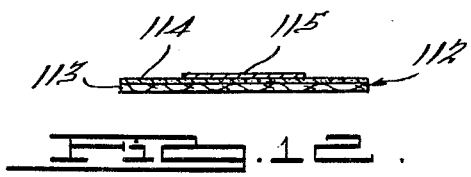
INVENTOR.
William F. Veling
BY
Harness, Dickey & Pierce.
ATTORNEYS.

Sept. 4, 1962 W. F. VELING 3,052,233
CARDIAC MONITOR
Filed Sept. 24, 1958 3 Sheets-Sheet 3
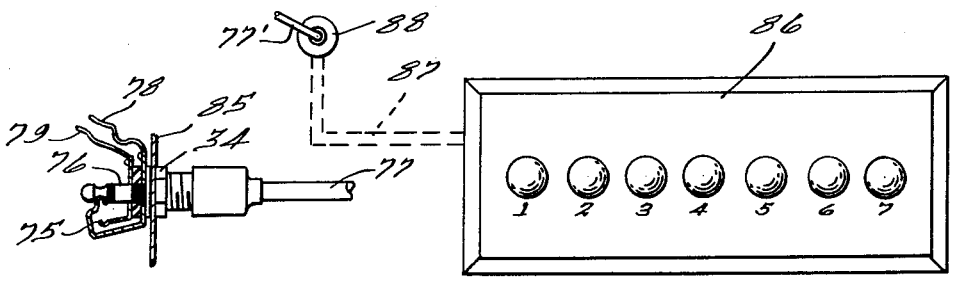
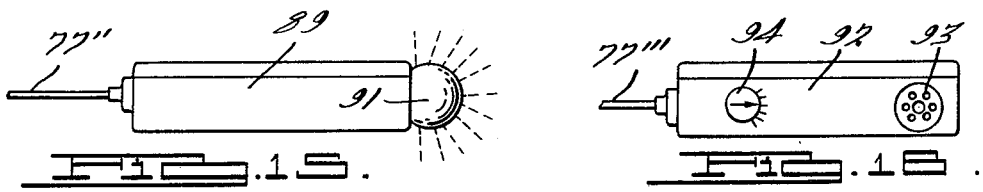
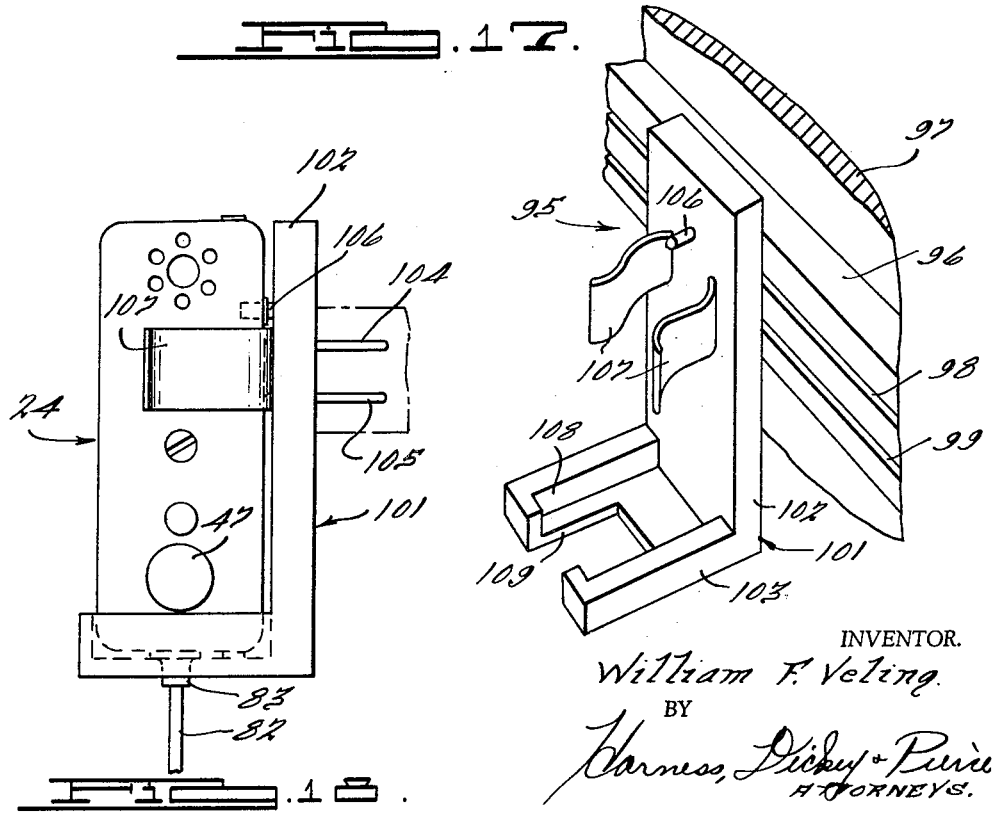
INVENTOR.
William F. Veling
BY
Harness, Dickey & Pierce
ATTORNEYS.

United States Patent Office 3,052,233
Patented Sept. 4, 1962

3,052,233
CARDIAC MONITOR
William F. Veling, 19210 Bretton Drive, Detroit, Mich.
Filed Sept. 24, 1958, Ser. No. 763,098
2 Claims. (Cl. 128—2.1)

This invention relates to cardiac monitors and more particularly to apparatus for providing a continuous audible or visual indication of heart action.

The use of electrocardiographic monitoring equipment for giving an instantaneous warning of heart abnormalities, such as cardiac arrest or ventricular fibrillation, during anesthesia and surgery is well known. Monitors of this type, using electrodes attached to different parts of the body surface, amplify a part of the electromotive force originating in the sinus node of the heart, and thus provide a continuous indication of the heart rate for diagnosis purposes, even when the patient may be clinically pulseless, so that proper corrective steps may be immediately instituted.

Monitors of this type which are currently available have considerable limitations which it is the general object of the present invention to overcome. Currently available monitors are generally of a cumbersome nature, are delicate and easily damaged, and are relatively expensive, thus greatly limiting their usefulness and preventing their practical application in many cases.

It is an object of the present invention to provide an improved cardiac monitor which is small, light, and easily handled, is of a rugged nature for use in emergency situations, and is inexpensive to manufacture.

It is another object to provide an improved miniature cardiac monitor of this type which comprises a completely self-contained unit and in which the casing may be mounted directly on the patient and used as the positive electrode, thus reducing the number of necessary leads during operation.

It is a further object to provide an improved cardiac monitor having the above characteristics, which is highly flexible in its application, allows freedom of movement of the patient, and may receive the constant attention of an operating room team while the team members carry out their other duties.

It is also an object to provide an improved miniature cardiac monitor of this type which can be easily modified to give either audible or visual signals, can be used while attached to or remote from the patient's body, and which minimizes the possibility of erroneous signals due to poor or loose contacts.

It is a further object to provide novel and improved means for attaching the cardiac monitor to a patient's body so as to maintain the monitor circuit in energized condition and to provide electrical contact between the monitor casing and body, thus eliminating the need for electrolytic jelly and reducing cleanup problems.

It is another object to provide an improved cardiac monitor of this type in which battery power will be automatically conserved whenever the instrument is removed from the patient. In this connection, it is an object to provide storage means for such a monitor which includes an automatic battery charge replenishing arrangement, so that maximum battery power will be assured at all times.

Other objects, features and advantages of the present invention will become apparent from the following detailed description taken in conjunction with the accompanying drawings, in which:

FIGURE 1 is a perspective view of the improved cardiac monitor of this invention, the instrument being applied to the left forearm of a patient;

FIGURE 2 is a top plan view of the monitor casing, showing the speaker ports, sensitivity control knob and on-off switch;

FIGURE 3 is a side elevational view of the casing, showing the removable battery compartment closure and the jack for connection to the battery recharging apparatus;

FIGURE 4 is an end view of the monitor taken in the direction of the arrow 4 of FIGURE 2 and showing the permanently connected electrode lead and the jack for connection of the alternate lead when the casing is to be mounted remotely from the patient's body;

FIGURE 5 is an end elevational view taken in the direction of the arrow 5 of FIGURE 2 and showing the jack for connection of an alternate indicator;

FIGURE 6 is an exploded perspective view of the cardiac monitor, showing the casing parts and chassis for the electronic components;

FIGURE 7 is a fragmentary cross-sectional view in elevation of the casing, showing the battery compartment;

FIGURE 8 is an end elevational view of the battery compartment taken in a direction of the arrow 8 of FIGURE 7;

FIGURE 9 is a schematic electrical circuit diagram of the unit;

FIGURE 10 is a perspective view of the negative electrode at the outer end of the permanently connected lead;

FIGURE 11 is a schematic view, with exaggerated dimensions, showing a suitable manner of attaching the monitor to a patient's body using adhesive tape which carries an electrically conductive strip;

FIGURE 12 is a cross-sectional view of an adhesive strip suitable for use in the arrangement of FIGURE 11;

FIGURE 13 is a fragmentary cross-sectional view of the jack for an alternate signal, showing a plug in place;

FIGURE 14 is an elevational view of a central wall panel with indicator lights for use in conjunction with a plurality of cardiac monitors connected to bedside leads;

FIGURE 15 is an elevational view of an alternative remote indicator in the form of a portable light signal carried by a casing similar to that of the monitor;

FIGURE 16 is another alternative indicator in the form of a portable audible signal;

FIGURE 17 is a perspective view of a storage and charging rack for use with the cardiac monitor; and FIGURE 18 is a side elevational view of a rack shown in FIGURE 17 with a cardiac monitor in place.

In general terms, the illustrated embodiment of the invention comprises an oblong casing of small size capable of being attached to the body of a patient, the casing being made of metal such as aluminum so that it acts as the positive electrode. A negative electrode is permanently fixed to the casing by means of a lead which may extend to another portion of the patient's body, thereby establishing a circuit for sensing a part of the electromotive force developed by the heart. The casing is composed of two inter fitting parts and encloses a chassis which supports the main components of the monitor. These include a replaceable battery having a compartment which permits the battery to be inserted only with the correct orientation, a high gain transistor amplifier having an oscillator output, a transducer for producing an intermittent audible signal in response to the oscillator, an on-off switch, a sensitivity control, the permanently connected negative electrode lead, and a jack for the connection of an alternate indicator lead.

Accessible at the outside of the casing are a manual knob for the sensitivity control, speaker ports which may be partially covered by tape to control the loudness of tone, and an on-off switch button which is held in depressed condition by the tape when the unit is attached to the patient's body. In attaching the unit, adhesive tape and electrolytic jelly may be used, or a conductive foil tape which eliminates the necessity of the jelly may be applied. A jack is provided for the attachment of an alternate indicating device when the intermittent audible signal is not desired. Should it be necessary to locate the monitor remotely from the patient's body, a lead may be attached to another jack connected to the casing. A combined storage and charging rack is also provided for holding the monitor when not in use and at the same time replenishing the battery charge.

Referring more particularly to the drawings, FIGURE 1 shows the improved cardiac monitor, generally indicated at 21, attached to the left forearm 22 of a patient by means of tape 23. FIGURE 1 illustrates the relatively small over-all size of the monitor which can be achieved because of the novel combination of elements which it incorporates. The casing of the monitor is generally indicated at 24 and in a suitable embodiment is approximately the size of a cigarette package, having rounded corners and edges for comfortable attachment to the body.

As seen best in FIGURES 3 and 6, casing 24 comprises a lower shell 25 and an upper shell 26 of interfitting construction, shell 25 being somewhat deeper than shell 26. The shells comprising casing 24 may be fabricated of an electrically conductive material such as aluminum having a brushed or satin finish for appearance purposes. One end wall 27 of lower shell 25 is provided with a notch 28 for accommodating the permanently attached lead to be later described. A jack 29 is also provided in end wall 27 for the reception of a lead connected to the shell when monitor 21 is to be mounted remotely from the patient. A plug 31 may be provided for closing jack 29 when it is not in use.

The other end wall 32 of shell 25 has a notch 33 for accommodating a jack 34 seen in FIGURES 3 and 5, used as an alternate indicator lead. A threaded aperture 35 is provided in one side wall 36 of shell 25, the diameter of this aperture being sufficient to permit passage of a storage battery as later described. A threaded cover 37 is provided for closing aperture 35. A jack 38 is located adjacent aperture 35 for the reception of a plug in the combined storage and charging rack, later described. A threaded and tapped post 39 is secured to a central portion of shell 25 and extends upwardly therefrom for retaining the parts chassis and upper shell 26, as later described.

Upper shell 26 has a central aperture 40 for the reception of post 39, and a screw 41 is provided for entering the tapped hole in the outer end of post 39 for securing the shells together. Also provided in shell 26 is a clearance aperture 42 for an on-off switch push button 43, this push button being mounted on a spring contact 44 which normally holds the on-off switch in open position. As seen best in FIGURE 3, push button 43 projects above the surface of shell 26 and may be depressed by engagement of tape 23, thus holding the switch in closed position. Adjacent aperture 42 is a clearance aperture 45 for a rotatable shaft 46 used to control the sensitivity rheostat, a knob 47 being securable to the outer end of this shaft and projecting a greater distance above shell 26 than does push button 43. A plurality of sound ports 48 are provided adjacent the other end of shell 26.

Disposed within casing 24 is a chassis 49 for supporting the various components of the monitor. This chassis is of generally flat shape and has a central aperture for reception of post 39, a nut 51 being provided for holding the chassis in place. An enclosure or housing 52 is secured to the central portion of the chassis which carries the electrical circuit components, not seen in FIGURE 6 but shown schematically in FIGURE 9. On-off switch 53 is mounted adjacent this housing, as is sensitivity control rheostat 54. On the other side of housing 52 is a battery housing 55, the details of the battery housing being seen best in FIGURES 7 and 8. Housing 55 is of cylindrical shape and is adapted to receive a storage battery, such as a mercury type, shown at 56 in FIGURES 7 and 8. Chassis 49 may be fabricated of plastic material, in which case battery housing 55 could be formed integrally with the plastic chassis. Housing 55 is aligned with threaded aperture 35 so that battery 56 may be passed through this aperture and into housing 55.

In order to prevent inadvertent reverse orientation of battery 56, which might damage the transistorized circuit later described, inner end wall 57 of housing 55 has an aperture 58 of relatively small diameter, so that only the narrow end 59 of battery 56, which is the negative pole, may pass therethrough. This narrow end is adapted to engage an upstanding spring contact 61 which is secured to a negative lead 62 leading to switch 53. An insulative member 63 is disposed between the lower end of contact 61 and battery housing 55. The positive pole 64 of battery 56 is of larger diameter than aperture 58 and could therefore not engage contact 61. Pole 64 is engageable by cover 37, which is of electrically conductive material, when the latter is threaded into aperture 35.

FIGURE 9 shows schematically a suitable transistorized circuit which is enclosed in housing 52. Although different circuit constructions could be utilized within the principles of the invention, a circuit of the type shown in FIGURE 9 has been found suitable in terms of compactness, ruggedness, sensitivity and cost. The portions of the circuit which are shown as connected to casing 24 may be so connected through post 39. As described previously, the positive side of battery 56 is connected to casing 24 by cover 37, and the negative side is connected to switch 53 by lead 62. When switch 53 is closed, it supplies power to a transistor circuit having three amplifier stages. These include a low-noise, high gain transistor 65 and two general purpose transistors 66 and 67, the gain of the amplifiers being preferably of the order of 50 decibels. The amplified pulse appearing at the output of these amplifiers is applied to a general purpose transistor 68 arranged as a triggered oscillator and which when activated by signal impulses of sufficient amplitude produces amplified "beep" signals of audio frequency. Negative electrode 69 is connected to the input of transistor 65 through a capacitor 71, and transistors 65, 66, 67 and 68 are coupled by conventionally wired resistors and capacitors which need not be described in detail. The sensitivity potentiometer 54 is placed in the base bias network of oscillator transistor 68 together with an oscillator transformer 72 and a capacitor 73. Potentiometer 54 thus serves as a control of sensitivity, provides a limited means for adjusting the frequency of the oscillator, and makes selection of the oscillator transistor much less critical. While grounded emitter amplifiers are shown in the illustrated embodiment, it will be apparent that other amplifying means could be employed if desired.

Sound output is produced by a transducer which may comprise a high impedance crystal earpiece 74 mounted on chassis 49 adjacent battery housing 55, as seen in FIGURE 6. Transducer 74 is connected to transistor 68 through a normally closed switch 75, this switch being openable by a plug 76 which may be inserted in jack 34, as seen in FIGURE 13. When plug 76 is inserted in the jack, it connects a two-wired lead 77 to oscillator transistor 68 through wires 78 and 79, thus serving to substitute an alternate indicator for transducer 74, for purposes later described.

It should be noted that the circuit shown in FIGURE 9 is especially adapted for fabrication by printed circuit techniques in an extremely compact fashion. The entire circuit with the exception of the capacitors, which may be of an electrolytic type, are preferably embedded in a plastic such as an epoxy resin and enclosed within housing 52.

A flange 81 is provided at one end of chassis 49, as shown in FIGURE 6, and a lead 82 is permanently secured to this flange and carries negative electrode 69. A rubber strain relief element 83 is preferably provided at the juncture of lead 82 with flange 81, this element being disposable within slot 28 when the parts are assembled. The permanent connection of lead 82 with the chassis will prevent accidental disconnection of the lead which might otherwise occur due to movement of the patient's body. As shown in FIGURE 10, negative electrode 69 is of flat configuration with rounded corners and edges, and is made of aluminum or other electrically conductive material. A rubber strain relief element 84 may be provided between electrode 69 and lead 82. The lead is preferably of sufficient length, for example, five feet, to enable it to be attached to the patient's body at a point which will form a reasonable angle across the heart axis with casing 24. As mentioned previously, an alternate lead (not shown) is also provided for insertion in jack 29, which is electrically connected with casing 24, in cases where monitor 21 is to be located at some distance from the patient.

A flange 85 is formed at the end of chassis 49 opposite that which carries flange 81, jack 34 being mounted on flange 85. FIGURES 14, 15 and 16 illustrate several alternative types of indicators which may be used in conjunction with monitor 21 by connection to jack 34. FIGURE 14 shows a central wall panel 86 having a plurality of indicator lamps, the wall panel being mounted at an appropriate station where it may be continually observed. Each indicator lamp is connected by wires shown schematically at 87 to a bedside receptacle 88 to which a lead, indicated at 77', may be connected. In this manner a large number of patients in a ward or on a hospital floor may receive cardiac monitoring attention with a minimum of personnel. FIGURE 15 shows a casing 89 carrying an indicator lamp 91, the casing being connected by a lead 77" to the heart monitor. Casing 89 may carry a self-contained battery power supply (not shown) which is connected to lamp 91 in such manner as to be triggered by the impulses received through lead 77". As illustrated, casing 89 is of a shape similar to casing 24 of monitor 21, so that casing 89 may be mounted in a combined storage and charging rack to be later described with respect to monitor 21.

FIGURE 16 shows a casing 92 carrying an audible indicator 93 with a volume adjustment knob 94. As in the case of FIGURE 15, a battery power supply may be enclosed in casing 92 which is connected by a lead 77''' with jack 34 of monitor 21. It should be noted that in both the embodiments of FIGURES 15 and 16, their respective casings may be mounted remotely from the patient.

FIGURES 17 and 18 illustrate a combined storage and recharging rack assembly which may be used in conjunction with monitor 21. The rack assembly is generally indicated at 95 and includes a terminal strip 96 secured to a wall 97 a sufficient distance above the floor to permit lead 82 to hang freely, as described below. Strip 96 may, for example, be for 110 volts A.C., having two parallel plug-in slots 98 and 99 therein. A holder generally indicated at 101 is mounted on strip 96 and comprises a downwardly extending housing 102 and a cradle 103 extending outwardly from the lower end of the housing. Holder 101 has a pair of prongs 104 and 105, seen best in FIGURE 18, which may be inserted in slots 98 and 99, respectively. Several holders 101 may thus be mounted alongside each other for the storage of a group of monitors. Prongs 104 and 105 are connected to electrical components (not shown) within housing 102 which are adapted to rectify and adjust the voltage supplied by slots 98 and 99 to a D.C. charging voltage for the rechargeable battery. One side of the output from this rectifier is connected to a prong 106 projecting from housing 102, and the other side to a pair of spring arms 107 which extend from housing 102 slightly below prong 106. Prong 106 is adapted to be received by jack 38, which is connected by means (not shown) to contact 61 on the negative side of battery 56. Spring clips 107 are adapted to conductively engage casing 24 when the latter is mounted in cradle 103. The cradle is recessed, as indicated at 108, for receiving one end of casing 24 when in an upright position. An open-ended slot 109 is provided in cradle 108 for accommodating strain member 83 of lead 82.

It will thus be seen that by placing monitor 21 on cradle 103 and inserting it between spring clips 107 and over prong 106, the monitor may be stored overnight or for as long a period as necessary and will meanwhile receive a battery charge which may be regulated by the electrical components within housing 102. Freshness of the battery and the reliability of performance will thus be assured each time the monitor is used.

In using monitor 21, it will be applied to an appropriate part of the patient's body, such as forearm 22 illustrated in FIGURE 1. One method of applying the monitor may be to place electrolyte jelly between casing shell 25 and forearm 22 so that electrical conductivity will be assured. Adhesive tape 23 may then be wrapped around the forearm and monitor in such fashion that push button 43 will be depressed, thus automatically closing the amplifier circuit. Lead 82 is then extended to another part of the body, such as the right forearm (not shown) and negative electrode 69 taped thereon.

Another method of applying monitor 21 to the body of a patient is shown with exaggerated proportions in FIGURE 11, the body portion being indicated in this figure at 111. With this method, an adhesive tape generally indicated at 112 is used, this tape, as shown in FIGURE 12, comprising a cloth or plastic backing 113, an adhesive layer 114, and a ribbon of aluminum or other conductive foil 115 which may be somewhat narrower than backing strip 113. In mounting monitor 21 with this tape, one end of the tape is turned back on itself to form a tab 116, and the tape is wrapped firmly around the circumference of the extremity. When the starting point is reached, casing shell 25 of monitor 21 is placed in contact with tab 116 and tape 112 is then brought over the monitor casing, engaging push button 43, and is continued around the extremity a sufficient number of turns to hold the monitor in place. With this method, it has been found that electrolyte jelly may usually be omitted, since the accumulation of perspiration beneath the occlusive tape provides sufficient moisture and electrolytes for good electrical contact. The tape is disposable after use, and since direct contact between monitor 21 and the patient does not occur, cleanup is minimized. It should be noted that this method of application could also be used for negative electrode 69. Other types of applications, such as subcutaneous needle electrodes may also be used in conjunction with the invention where necessary.

After the monitor has been attached to the patient's body, the amplified signals will trigger oscillator 68 to provide a continuous series of audible signals from transducer 74. The volume of sound emitted by the transducer may be controlled by placing pieces of adhesive tape over selected sound ports 48. To control the sensitivity of pickup, control knob 47 may be rotated, although it has been found that in many cases merely applying the instrument will give a satisfactory signal without further adjustment. It should be noted that since there is only a single adjusting knob on the instrument, it may be easily manipulated even beneath surgical drapes.

Should an arrhythmia such as cardiac arrest or ventricular fibrillation occur, the resultant cessation of cardiac impulses will be immediately observed by a cessation of the audible "beep" signals, so that proper and adequate treatment can be instituted. Under conditions of extreme shock or peripheral vascular collapse, where the heart is still functioning, the audible signals will continue, and other information such as a drop in blood pressure or pulse amplitude will enable a correct diagnosis with proper measures being taken.

It should be observed that since, under ordinary conditions, the entire instrument will be mounted on the patient, complete freedom of movement will be permitted, and the absence of long lead lines to remote locations will also permit unrestricted movement of operating personnel. At the same time, the provision of jack 29 will permit monitor 21 to be used away from the body when desirable, such as in infant surgery. In places such as the operating recovery room where a light or meter indicator is required, jack 34 may be utilized together with an alternate indicator such as those shown in FIGURES 14 and 15. Because of its versatile nature, monitor 21 could be highly useful in other areas, such as during recovering from anesthesia or surgery, for observation purposes, or under certain research conditions.

While it will be apparent that the embodiments of the invention herein disclosed are well calculated to fulfill the objects of the invention, it will be appreciated that the invention is susceptible to modification, variation and change without departing from the proper scope or fair meaning of the subjoined claims.

What is claimed is:

1. In a cardiac monitor assembly, electrode means including a pair of electrodes adapted for attachment to spaced portions of the body of a patient, flexible electrical conductor means extending between and mechanically and electrically connected to both of said electrodes, electrically operable heart impulse sensing means carried entirely by said electrode means, an electrical power source also carried entirely by said electrode means, means for connecting said power source to said sensing means, securing means for fastening said electrodes to the body, a disconnect switch for electrically connecting and disconnecting the power source with respect to the sensing means, means biasing said switch to the disconnect position, and an actuator for said switch carried by and exposed at the surface of one of said electrodes and movable in a direction toward said electrode to overcome said biasing means and actuate the switch to the connecting position, whereby the securance of said electrode against the body by said securing means is effective to move the actuator toward and hold it in the position corresponding to the connecting position of the switch.

2. A cardiac monitor including two electrode means, one of said electrode means comprising a hollow, integrated container-electrode of elongated shape, the width of said container-electrode being not materially greater than the average width of a patient's arm, a miniaturized cardiac monitoring system entirely housed within said container-electrode and electrically connected thereto, a transducer operable by said system and also housed in said container-electrode, a single flexible conductor cord constituting the only electrical and mechanical connection between said two electrode means, means positively connecting one end of said conductor cord mechanically but non-electrically to said container-electrode, means electrically connecting said same end of the conductor cord to said system, and means for electrically and mechanically connecting the other end of the conductor cord to the other electrode means.

References Cited in the file of this patent

UNITED STATES PATENTS

| | | |
|---|---|---|
| 1,662,446 | Wappler | Mar. 13, 1928 |
| 1,981,210 | Wheat | Nov. 20, 1934 |
| 2,298,125 | Hartman | Oct. 6, 1942 |
| 2,397,469 | Casanov | Apr. 2, 1946 |
| 2,552,480 | Dickey | May 8, 1951 |
| 2,813,265 | Finks | Nov. 12, 1957 |
| 2,829,637 | McCormick | Apr. 8, 1958 |
| 2,848,992 | Pigeon | Aug. 26, 1958 |
| 2,850,648 | Elliott | Sept. 2, 1958 |
| 2,894,150 | Bopp | July 7, 1959 |